United States Patent [19]

Tateoka et al.

[11] 4,343,531

[45] Aug. 10, 1982

[54] LIGHT BEAM SCANNING DEVICE WITH CONSTANT SPOT INTENSITY AND SCAN SPEED RELATED MODULATING MEANS

[75] Inventors: Masamichi Tateoka; Takao Tsuji, both of Kawasaki, Japan

[73] Assignee: Canon Kabushiki Kaisha, Tokyo, Japan

[21] Appl. No.: 119,455

[22] Filed: Feb. 7, 1980

[30] Foreign Application Priority Data

Feb. 16, 1979 [JP] Japan .................................. 54/16961

[51] Int. Cl.³ ............................................. G02B 27/17
[52] U.S. Cl. ..................................... 350/6.5; 350/474; 350/479
[58] Field of Search ............................. 350/6.1–6.91, 350/285, 225, 232; 250/235, 236; 358/206, 208, 293; 346/108

[56] References Cited

U.S. PATENT DOCUMENTS

| | | | |
|---|---|---|---|
| 3,573,849 | 4/1971 | Herriot et al. | 350/6.8 |
| 3,597,536 | 8/1971 | Fowler | 358/206 |
| 3,848,087 | 11/1974 | Carrell | 350/6.8 |
| 3,961,838 | 6/1976 | Zanoni | 350/6.8 |
| 4,032,888 | 6/1977 | Broyles et al. | 358/208 |
| 4,160,939 | 7/1979 | Damouth et al. | 350/6.8 |
| 4,178,064 | 12/1979 | Mrdjen | 250/236 |

*Primary Examiner*—Jon W. Henry
*Attorney, Agent, or Firm*—Fitzpatrick, Cella, Harper & Scinto

[57] ABSTRACT

A light beam scanning device of a construction, in which an image forming scanning optical system is provided with an expedient for preventing spot intensity of a light beam on a scanning surface from falling off at a peripheral region of a scanning object in comparison with its center part, and a light beam modulator is provided with an expedient for making constant a length of a single dot drawn by a beam spot with respect to one modulating signal on the scanning surface.

4 Claims, 18 Drawing Figures

LIGHT BEAM SCANNING DEVICE WITH CONSTANT SPOT INTENSITY AND SCAN SPEED RELATED MODULATING MEANS

BACKGROUND OF THE INVENTION

This invention relates to a light beam scanning device which scans at a high speed a light beam emitted from a light source such as, for example, laser beam, etc., by deflecting and modulating the same.

In the light beam scanning devices which deflects and scans a light beam from a light source using a deflector such as a rotatory polygonal mirror or a galvano-mirror to thereby scan a scanning surface, it is desired that intensity of a beam spot on the scanning surface have a substantially uniform value at every point on the scanning surface, and that moving speed of the beam spot be substantially constant.

Various arts of moving the beam spot at an equal speed have heretofore been proposed. U.S. Pat. No. 3,573,849, for example, teaches to use an image forming lens for scanning, in which the focal length thereof changes depending on an incident angle of the beam. Further, there have been proposed techniques of varying length of modulating signal input into the modulator, or controlling a rotational angle of the deflector.

On the other hand, in the conventional beam scanning device, for the light beam to be deflected by a rotatory polygonal mirror, and for the thus deflected light beam to be focused on the scanning surface in the form of a spot to scan the surface of a scanning object, use is made of a $y = f \tan \theta$ lens or an $f \cdot \theta$ lens (where: y denotes a distance from the optical axis of the image forming lens to an image forming position of the light beam; f is a focal length of the image forming lens; and $\theta$ is an angle formed by the optical axis of the image forming lens and the light beam entering the image forming lens) as an image forming scanning lens. On account of this, when the incident angle of the beam into the image forming lens becomes large, the spot intensity at the peripheral region of the scanning surface becomes remarkably low in comparison with the spot intensity at the center part thereof with the consequence that irregularity in image density takes place inconveniently. Therefore, when a spot having an intensity of a certain definite value and above is to be obtained over the entire scanning surface, it becomes necessary that the low spot intensity at the peripheral region on the scanning surface be taken as a reference, for which purpose a high output light source as disclosed in a laid-open Japanese patent application No. 52-99836 should be used.

SUMMARY OF THE INVENTION

In view of the above statement, it is a primary object of the present invention to provide a light beam scanning device, wherein a spot intensity of a light beam on a scanning surface be substantially constant.

It is another object of the present invention to provide a light beam scanning device capable of reproducing a distortion-free image, even when the scanning speed of a light beam spot on the scanning surface differs at the center part and the peripheral part of the scanning surface.

In order to attain the abovementioned objects, the light beam scanning device according to the present invention is so constructed that means for maintaining constant the beam spot intensity of the light beam on the scanning surface is provided on the image forming scanning optical system, and further means for making uniform a dot width for a moving beam spot on the scanning surface with respect to one modulating signal, irrespective of changes in the scanning speed of the beam spot on the scanning surface, is provided on a modulating means to modulate the light beam.

The light beam scanning device according to the present invention prevents the light quantity on the scanning surface from lowering by making the distortion of the image forming scanning optical system interposed between the deflector and the scanning surface to be greater than ⅔ and smaller than 1.13. This distortion should preferably be taken at a value of ⅔ to enable the beam spot intensity at both center part and peripheral part of the scanning surface to be made constant. For the image forming lens of this sort which has so far been known, there is a "$y = f \cdot \sin \theta$" lens, the distortion of which is 1. Using this f·sin $\theta$ lens, it is possible to make the spot intensity on the scanning surface to be sufficiently uniform.

Further, the light beam scanning device according to the present invention is to make constant a moving quantity of the beam spot on the scanning surface with respect to one modulating signal by controlling a modulating time of a modulating signal to be imparted to the light beam. In more detail, when an incident angle of a light beam deflected by a scanning means such as an equi-angular speed rotatory polygonal mirror or a sinusoidally vibrating galvano-mirror and entering into the image forming scanning optical system varies with lapse of time, the moving speed of the beam spot position formed on the image forming surface non-linearly changes, hence it is not constant. Accordingly, correction is done by applying a non-equal time interval signal which serves as an information signal to a light modulator for "on-off" control of the light beam.

In the light beam scanning device according to the present invention, the modulating signal for modulating the scanning light beam is formed, for example, in an electric processing circuit by capturing the light beam immediately before its scanning the scanning surface, and then using the beam detect signal as a trigger signal. When the light source consists of a semiconductor laser, this modulating signal modulates the light beam by directly applying the trigger signal to the semiconductor laser. When the light source consists of a laser which continuously oscillates, the light beam modulation is done by introducing an input modulating signal into the modulator provided between the light source and the modulator.

DETAILED DESCRIPTION OF PREFERRED EMBODIMENTS

Figure 1:
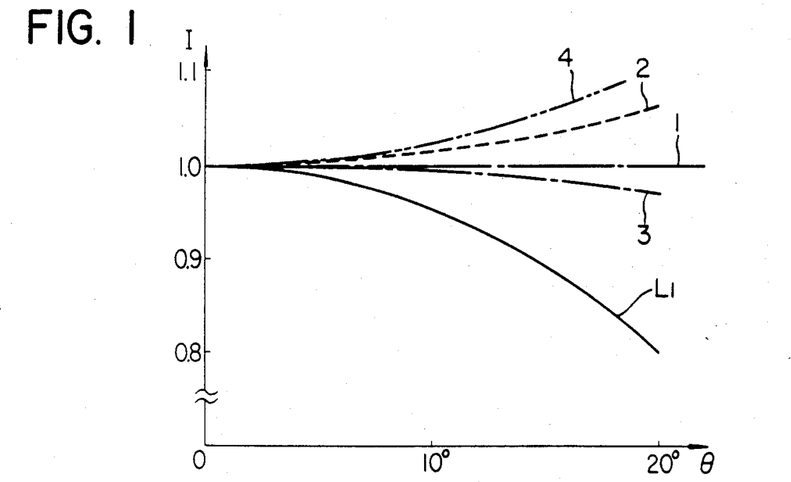
FIG. 1 is a graphical representation showing a relationship between distortion of the scanning lens and intensity of the beam spot.

FIG. 1 is a graphical representation showing a relationship between a lens distortion V and a spot intensity $I(\theta, V)$ on the scanning surface, in which the ordinate represents the spot intensity I and the abscissa denotes an incident angle $\theta$ formed by the incident beam and the image forming scanning lens. The spot intensity I on the scanning surface is expressed by the following equation (1) with the abovementioned incident angle $\theta$ and the distortion V of the image forming lens as the parameters.

$$I(\theta, V) = [1 + (V-1) \tan^2 \theta]^2 / \cos \theta \qquad (1)$$

The optical layout of this image forming lens is of such a construction that the scanning surface coincides with one of the focal planes of the image forming lens. When the above equation (1) is approximated with $\theta$ within a range of the third order, the following equation (2) derives.

$$I(-, V) = [1 + 2(V-1)\theta^2]/(1 - \tfrac{1}{3}\theta^2) \qquad (2)$$

For the spot intensity $I(\theta,V)$ to be 1 irrespective of the value of $\theta$, a value of V may be ⅔ (V=⅔). That is, in the third order approximation, a lens having a value of V=⅔ renders the spot intensity on the scanning surface to be perfectly uniform. This lens is expressed in terms of the following equation (3) within a range of the third order approximation.

$$y = f[\tan \theta - \tfrac{2}{3} \tan^3 \theta] \qquad (3)$$

This state is shown in FIG. 1, in which a curve 2 indicates the so-called f-sin $\theta$ lens, having a value of V=1, a curve 3 denotes the so-called f-$\theta$ lens having a value of V=⅔, and a curve 4 represents a lens having a value of V=1.13. As shown in FIG. 1, when the value of V is greater than ⅔ but smaller than 1.13, variations in the light quantity of the beam spot are permitted, hence variations in the other aberrations such as spherical aberration, coma, and astigmatism, etc. are permitted. It is however preferable that a lens having a value of V=⅔ or V=1 be used.

A curve L1 in FIG. 1 indicates the so-called "f-tan $\theta$" lens having a value of V=0. As is apparent from the drawing, this f-tan $\theta$ lens causes large defect in the light quantity at the peripheral region thereof.

In the following, explanations will be given as to the beam modulation for obtaining an equal moving speed of the beam spot on the scanning surface when the lens having such distortional characteristic as mentioned above is used. First of all, a case wherein the f-sin $\theta$ lens of V=1 is used as the image forming scanning lens will be explained.

In case the deflector is an equi-angular speed deflector like the rotatory polygonal mirror, the angle of deflection is equal in speed with respect to time, hence the incident angle $\theta$ of the light beam entering the image forming lens is denoted by $\theta = 2\omega t$ (where: $\omega$ is an angular speed of the deflector (rotatory polygonal mirror); and t is a time). Also, the image forming lens has the characteristic as expressed by the following equation (4).

$$y = f \sin \theta = f \sin (2\omega t) \qquad (4)$$

A scanning speed v(t) of the beam spot on the image forming surface (scanning surface) is expressed by the following equation (5).

$$v(t) = dy/dt = 2\omega f \cos (2\omega t) \qquad (5)$$

Further, a dot width dy on the image forming plane corresponding to a modulating signal of a time dt which stands for one dot at a position y(i.e., a time t) on the image forming surface is represented by the following equation (6).

$$dy = 2\omega f \cos (2\omega t) dt \qquad (6)$$

In order, now, to obtain an equal dot width dy=k (where: k is a constant), the time dt corresponding to one dot at the position y (time t) should satisfy the following relationship.

$$dt = dy/2\omega f \cos (2\omega t) = k/2\omega f \cos (2\omega t) \qquad (7)$$

Since the above equation (7) represents an interval time of a modulating signal at a half angle of view of the $y=f \sin \theta$ lens, the deflector is so deflected that it may pass through the optical axis of the $y=f \sin \theta$ lens when $t=\delta$, provided that a time required for the deflector to deflect by $-\beta$ to $\beta$ is assumed to be $2\delta$. Consequently, the relationship of $t=\delta$ corresponds to a relationship $t=0$ in the above equation (7), as the result of which the value t in the equation (7) may be put as $t-\delta$. That is to say, the interval of the modulating signal to the light modulator corresponding to an image element to be recorded, i.e., an image element frequency, should be taken out as an output in accordance with the following equation.

$$dt = k/2\omega f \cos \{2\omega(t-\delta)\}, \ (0 \le t \le 2\delta) \qquad (8)$$

Figure 2:
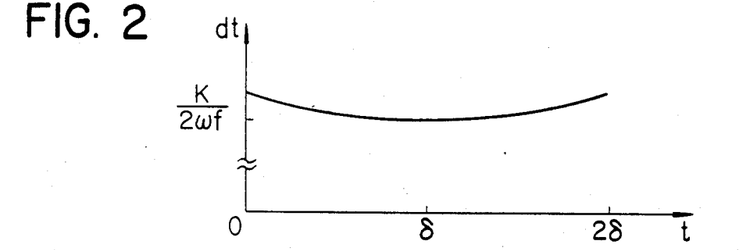
FIGS. 2 to 5 are respectively graphical representations showing examples of beam modulating signal used for the device according to the present invention.

This condition is represented in FIG. 2. As the result of this, the interval time becomes prolonged as the scanning operation goes toward the peripheral region of the scanning surface, whereby the modulating frequency to be introduced as an input into the modulator becomes smaller.

Next, in case the sinusoidally vibrating deflector such as the sinusoidally vibrating galvano mirror is used as the deflector, the angle of deflection of the light beam, i.e., the incident angle $\theta$ is expressed by the following equation (9), when the amplitude of the sinusoidally vibrating mirror is $\phi_0$, its cycle is $2\pi/\omega$, and a time is t.

$$\theta = 2\phi_0 \sin(\omega t) \quad (9)$$

Therefore, the image forming lens has the characteristics as expressed by the following equation (10).

$$y = f \sin \theta = f \sin \{2\phi_0 \sin(\omega t)\} \quad (10)$$

On the other hand, the scanning speed v(t) of the beam spot on the image forming surface (scanning surface) is represented by the following equation (11).

$$v(t) = dy/dt = 2\phi_0 \omega f \cos\{2\phi_0 \sin(\omega t)\} \cos(\omega t) \quad (11)$$

Therefore, same as mentioned in the foregoing, in order to obtain an equal dot width $dy = k$, the image element frequency at the position y (time t) should satisfy the following relationship.

$$dt = {}^{dy}\!/2\phi_0 \omega f \cos\{2\phi_0 \sin(\omega t)\}\cos(\omega t) \quad (12)$$
$$= {}^{k}\!/2\phi_0 \omega f \cos\{2\phi_0 \sin(\omega t)\}\cos(\omega t)$$

Since the above equation (12) represents the image element frequency of the $y = f \sin \theta$ lens at the half angle of view, an interval of an input signal into the modulator, i.e., a clock frequency, should be produced as an output in accordance with the following equation in the same manner as mentioned in the foregoing.

$$dt = k/2\phi_0 \omega f \cos[2\phi_0 \sin\{\omega(t-\delta)\}] \cos\{\omega(t-\delta)\} \quad (13)$$

Figure 3:
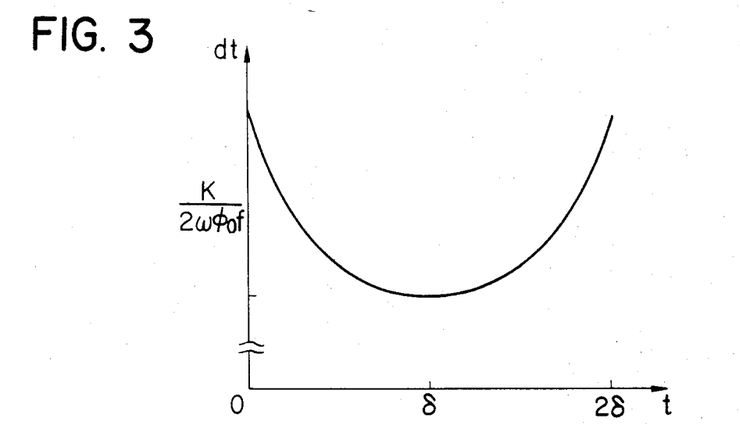

This situation is denoted in FIG. 3. In this case, too, the interval time becomes longer as the scanning proceeds toward the peripheral region of the scanning surface, and the modulating frequency input into the modulator becomes small, whereby the same effect as mentioned above will result.

In the following, explanations will be given as to the beam modulation when the image forming lens having the distortion of ⅔ (i.e., the lens represented by the equation (3)) is used. When the image forming lens expressed by the equation (3) is used, the interval of the input signal into the modulator, i.e., the clock frequency in case the deflector deflects at an equi-angular speed, should be produced as an output in accordance with the following equation:

$$dt = (k/2\omega f)2 \cos^2 \{2\omega(t-\delta)\}/[2-(9/4)\tan^2\{2\omega(t-\delta)\}] \quad (14)$$

and it should be taken out in accordance with the following equation:

$$dt = (k/2\omega\phi_0)(2 \cos^2\{2\phi_0 \sin \omega(t-\delta)\})/(\cos \omega(t-\delta)[2-(9/4)\tan^2\{2\phi_0 \sin \omega(t-\delta)\}]) \quad (15)$$

Figure 4:
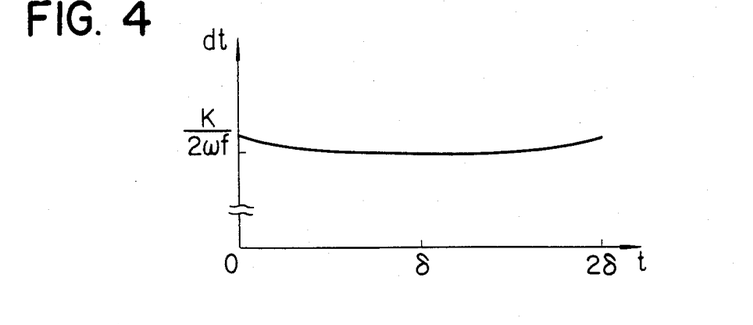
Figure 5:
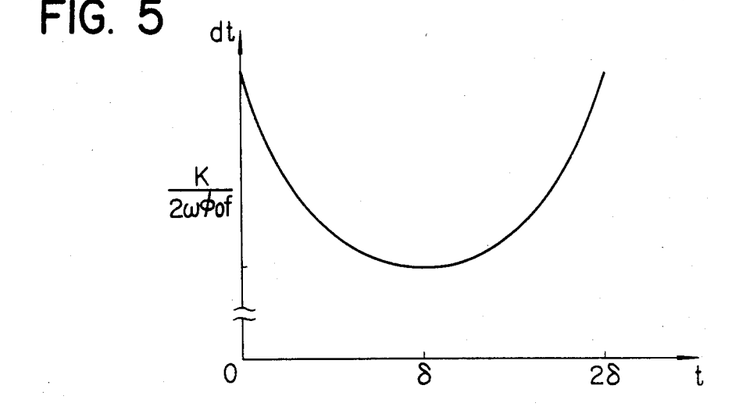

The situation in the equation (14) is shown in FIG. 4, and the situation in the equation (15) is indicated in FIG. 5. In these cases, the same effects as mentioned in the foregoing would result.

The above equation (13) represents a case of the image forming lens wherein the spot intensity perfectly coincides in the range of the third order approximation. Even in a higher order of approximation, such perfect coincidence can be attained in the same manner.

Figure 6:
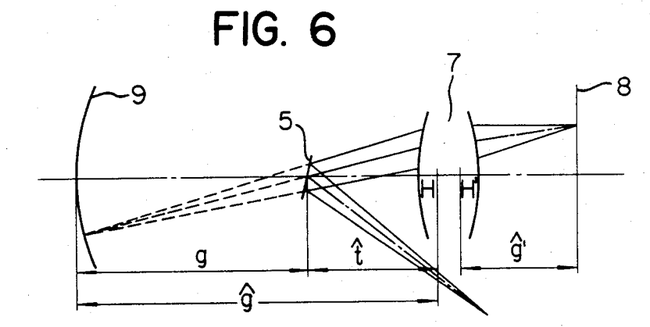
FIG. 6 is a diagram for explaining a case wherein the scanning beam is not a parallel beam in the device of the present invention.

In the explanations so far made, the light beam entering into the image forming lens is the parallel light beam. Same thing can also be said of the incident beam into the image forming lens which is diverging or converging. In these cases, the focal length f of the image forming lens may be replaced as follows in accordance with the representation in FIG. 6, whereby the uniform spot intensity can easily be obtained.

$$\hat{f} = \{\hat{g}' - (1 - \hat{g}'/f)\hat{t}\} \quad (16)$$

(where: g denotes a distance between the deflector 5 and an apparent beam diverging point (light source) 6 of a divergent beam incident on the deflector, as shown in FIG. 6; $\hat{t}$ represents a distance between the deflector 5 and the front side principal point H of the image forming lens system 7; $\hat{g}'$ indicates a distance between the rear side principal point H' of the image forming lens system 7 and the scanning surface 8; and $\hat{g}$ is a distance between the front side principal point H of the image forming lens system 7 and the diverging point 6 of the abovementioned beam). Incidentally, in FIG. 6, a reference numeral 9 designates a virtual light source on an arc which the abovementioned diverging point 6 forms with the deflecting action of the deflector 5, as viewed from the side of the image forming lens system 7.

Figure 7:
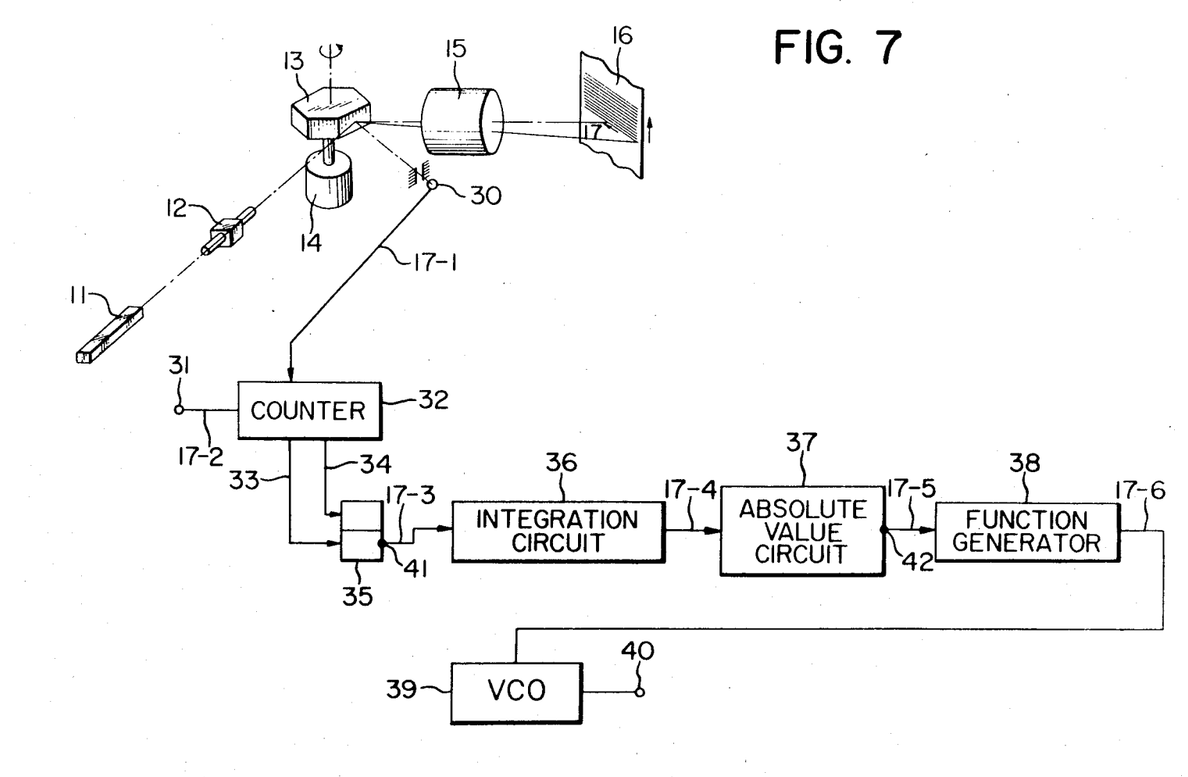
FIGS. 7 and 8 are schematic diagrams, partly in perspective and partly in block diagram, showing preferred embodiments of the recording device, in which the light beam scanning device of the present invention has been incorporated.
Figure 8:
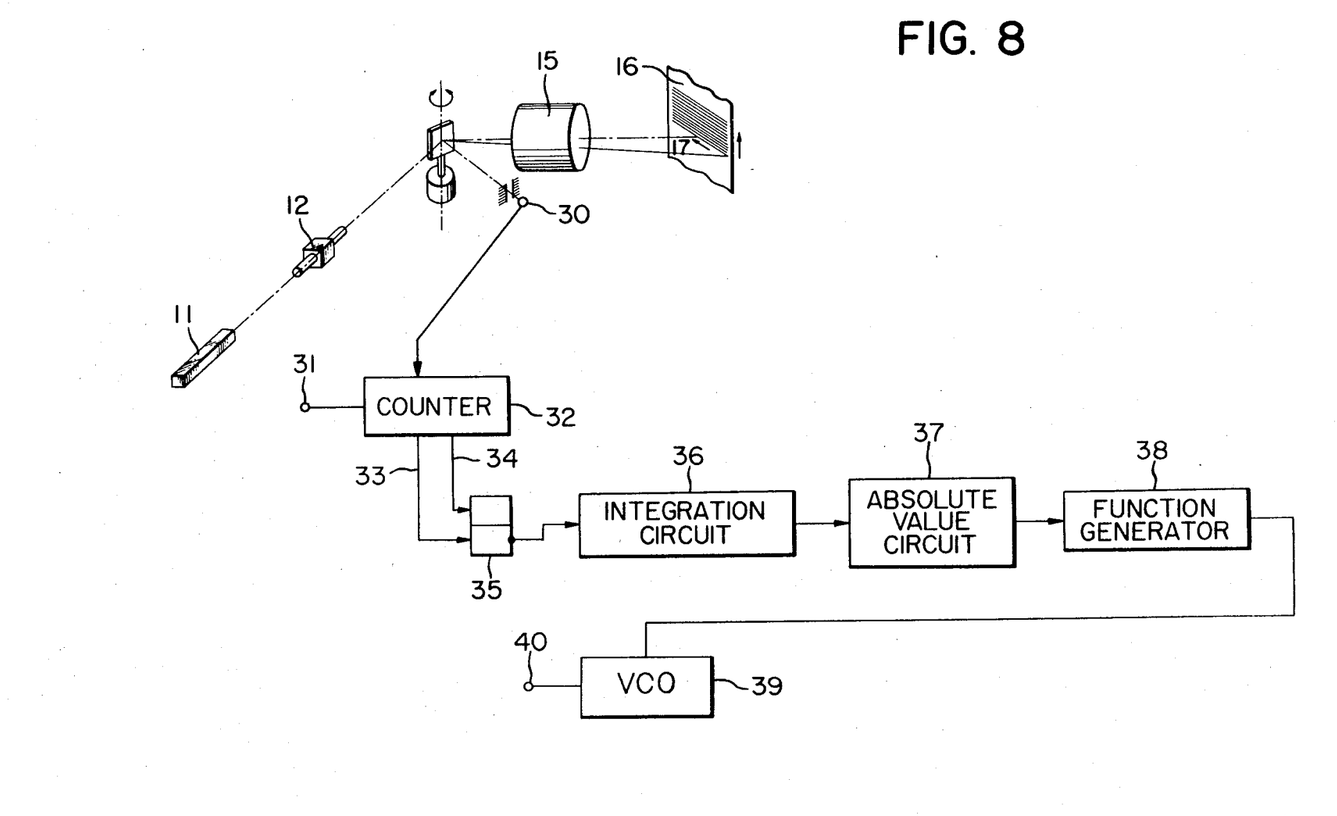
Figure 9:
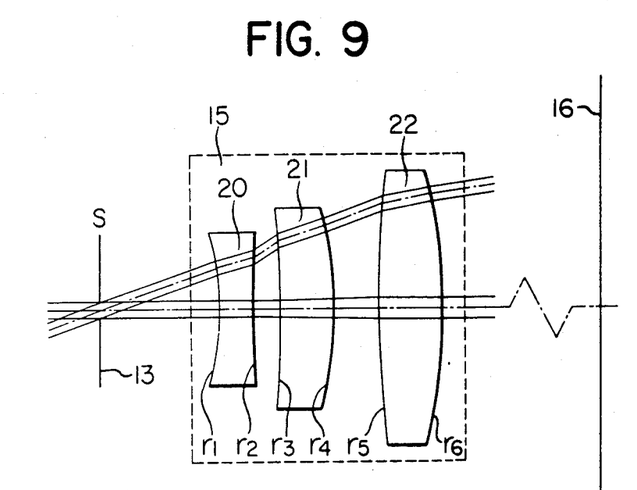
FIG. 9 is a cross-sectional view of one embodiment of the image forming scanning lens to be used for the device according to the present invention.

In the following, specific embodiments using the light beam scanning device according to the present invention will be explained. FIGS. 7 and 8 illustrate the basic layouts of one embodiment of the light scanning recording device, to which the present invention is applied, wherein FIG. 7 shows a case of using the rotatory polygonal mirror as the deflector, and FIG. 8 shows a case of using the galvano mirror as the deflector. In FIG. 7, laser beam oscillated from a laser beam oscillator 11 is led to an input opening of a light modulator 12. The beam which has been subjected to the intensity modulation by the light modulator 12, as will be described later, is projected onto a rotatory polygonal reflecting mirror 13. The rotatory polygonal reflecting mirror 13 is mounted on a shaft held by high precision bearings, and is rotated by a motor 14 which rotates at a constant rotational speed. The beam deflected by the rotatory polygonal mirror 13 is deflected at an equi-angular speed, then projected into an image forming lens 15, and finally focussed on a photosensitive material 16. The image forming lens 15 has a relationship of $y = f \sin \theta$, the structure of which is shown in FIG. 9. As shown in FIG. 9, the image forming lens 15 is of a three-group-three-lens construction consisting of lenses 20, 21 and 22. In the case of a scanning system having a scanning width of 200 mm, the lens 20 is a concave lens and is positioned at 40 mm away from the surface S of the rotatory polygonal mirror 13. The lens 21 is a convex lens, and the lens 22 is also a convex lens with a space interval between it and the photosensitive material 16 being 403.3 mm. The detailed constructional data for the image forming lens 15 will be shown hereinbelow.

| Plane No. | R | D | N |
|---|---|---|---|
| r1. | −84.0625 | 10.0373 | 1.73157 |
| r2. | 358.7871 | 8.6881 | |
| r3. | −1846.3351 | 18.6742 | 1.6805 |
| r4. | −111.9705 | 15.1236 | |
| r5. | 502.6931 | 20.5992 | 1.7031 |

-continued

| Plane No. | R | D | N |
| --- | --- | --- | --- |
| r6. | −187.8649 | | |

(NOTE:
R denotes radius of curvature;
D aerial space interval on the axis, or lens thickness on the axis;
and N a refractive index)

Figure 10:
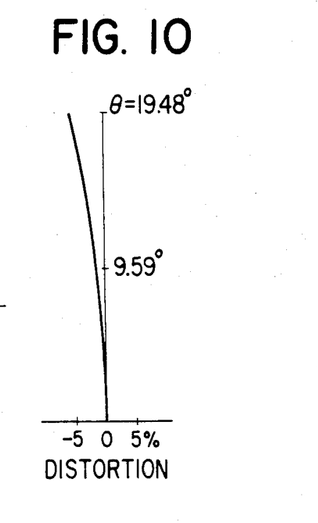
FIG. 10 is a graphical representation showing the distortion of the lens shown in FIG. 9.

The focal length of this image forming lens 15 is $f=300$ mm, its F-number is $F=60$, and its half angle of view is 19.48°. The distortion of this lens is shown in FIG. 10, provided distortion (%) is represented as follows.

$$\text{Distortion (\%)} = [(Y' - f \tan \theta)/f \tan \theta] \times 100$$

(where: $Y'$ is an image height of principal light ray.)

Accordingly, the image focussed by the image forming lens 15 scans in the direction of an arrow 17 on the scanning surface (photosensitive material surface) with respect to the light beam which is modulated by the modulator 12 in accordance with the relationship represented by the equation (7) and deflected by the rotatory polygonal mirror 13. In this instance, the dot width on the scanning surface is uniform, and no spot intensity lowers on the peripheral region of the scanning surface.

Figure 11:
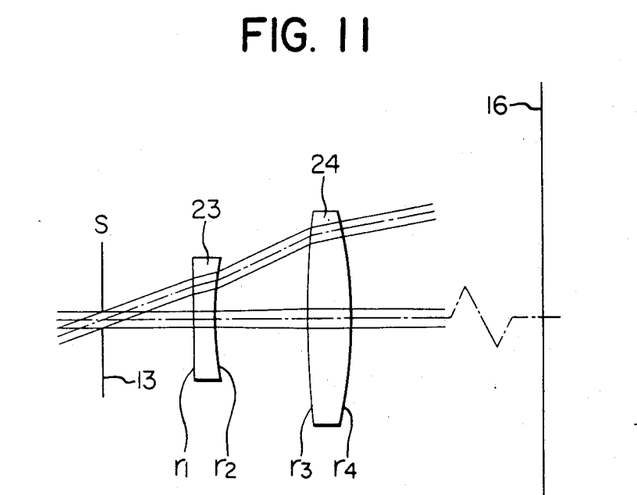
FIG. 11 is a cross-sectional view of another embodiment of the image forming scanning lens to be used for the device according to the present invention.
Figure 12:
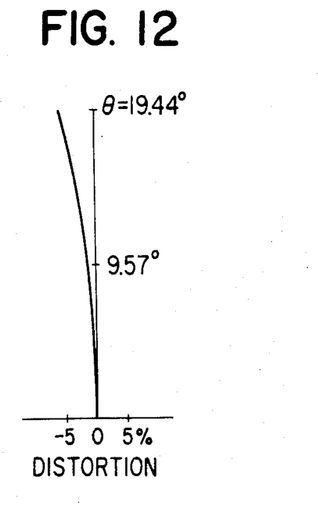
FIG. 12 is a graphical representation showing the distortion of the lens shown in FIG. 11.

FIG. 11 shows a cross-section of another embodiment of the $y = f \sin \theta$ lens, and FIG. 12 indicates the distortion of this lens. The lens system consists of two lenses, i.e., a concave lens 23 and a convex lens 24. A distance from the surface S of the rotatory polygonal mirror 13 to the first lens 24 is 30 mm. The details of the lens construction are shown in the following Table.

| Plane No. | R | D | N |
| --- | --- | --- | --- |
| r1. | −4211.5986 | 6.9876 | 1.60012 |
| r2. | 111.9264 | 30.4354 | 1. |
| r3. | 293.3224 | 14.4999 | 1.79924 |
| r4. | −167.8379 | | |

It should be noted that, even when a $y = f(\tan \theta - \frac{2}{3} \tan^3 \theta)$ lens is used as the image forming lens, the distortion in the output image can be readily removed in accordance with the above-described principle. In the following, one embodiment of the $y = f(\tan \theta - \frac{2}{3} \tan^3 \theta)$ lens will be described.

Figure 13:
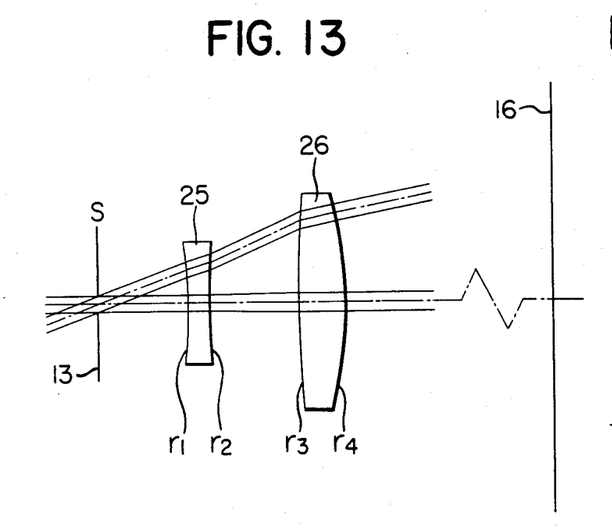
FIG. 13 is a cross-sectional view of still another embodiment of the image forming scanning lens to be used for the device according to the present invention.
Figure 14:
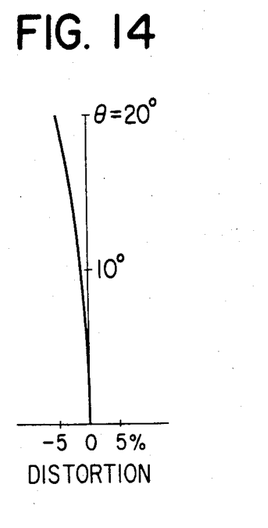
FIG. 14 is a graphical representation showing the distortion of the lens shown in FIG. 13.

FIG. 13 shows a cross-section of one embodiment of the $y = f(\tan \theta - \frac{2}{3} \tan^3 \theta)$ lens, and FIG. 14 shows the distortion of the lens. As shown in FIG. 13, the lens consists of two lenses, i.e., a concave lens 25 and a convex lens 26. A distance from the deflecting surface S of the deflector 13 to the first lens 25 is 30 mm. The detailed data of the lens will be shown in the following Table.

| Plane No. | R | D | N |
| --- | --- | --- | --- |
| r1. | −174.4093 | 6.9827 | 1.49984 |
| r2. | 200.05 | 29.9084 | 1. |
| r3. | 614.4806 | 14.6563 | 1.77052 |
| r4. | −128.1777 | | |

Figure 15:
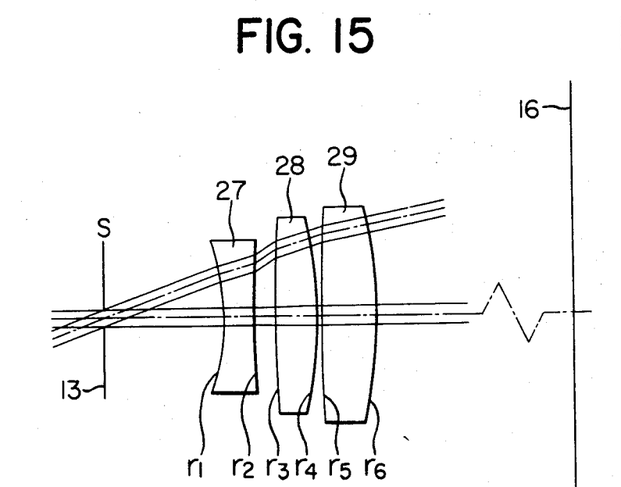
FIG. 15 is a cross-sectional view of yet another embodiment of the image forming scanning lens to be used for the device according to the present invention.
Figure 16:
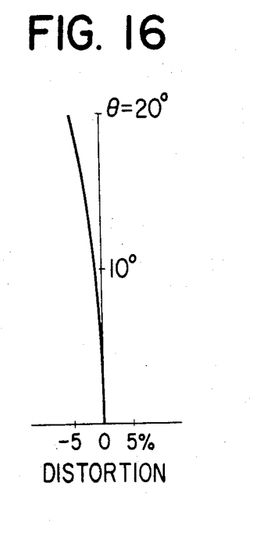
FIG. 16 is a graphical representation showing the distortion of the lens shown in FIG. 15.

FIG. 15 shows a cross-section of another embodiment of the $y = f(\tan \theta - \frac{2}{3} \tan^3 \theta)$ lens, and FIG. 16 shows the distortion of the lens. As shown in FIG. 15, the lens consists of three lenses, i.e., a concave lens 27, a convex lens 28, and a convex lens 29. A distance from the deflecting surface S of the deflector 13 to the first lens 27 is 40 mm. In the following, detailed data of the lens construction will be shown.

| Plane No. | R | D | N |
| --- | --- | --- | --- |
| r1. | −75.4559 | 9.5336 | 1.70948 |
| r2. | 391.6876 | 7.3424 | 1. |
| r3. | 3831.1843 | 14.1276 | 1.79148 |
| r4. | −111.6434 | 1.0016 | 1. |
| r5. | 1032.638 | 17.8627 | 1.6735 |
| r6. | −169.3872 | | |

In the following, explanations will be given as to an electrical circuit to control the image element frequency of the modulator 12 in FIG. 7 so as to satisfy the relationship $dt = k/2\omega f \cos\{2\omega(t-\delta)\}$ in the equation (8), in reference to FIGS. 7, 17 and 18.

In FIG. 7, a reference numeral 30 designates a photodetector to detect a beam detect signal (hereinafter abbreviated as "BD signal") to be a reference for the starting point of the scanning in advance of the laser beam scanning the photosensitive material 16. A numeral 31 refers to a clock signal input terminal of a certain definite frequency to be obtained from an oscillator such as quartz, etc. A numeral 32 refers to a counter having functions of being cleared by the BD signal, counting the clock signal, and producing outputs from terminals 33, 34 at a time instant when it has reached a predetermined count numbers to be described later.

A reference numeral 35 designates a flip-flop, 36 an integration circuit, 37 an absolute value circuit, 38 a function generator due to a tangential approximation, 39 a voltage control oscillator capable of controlling oscillation frequency by a voltage (hereinafter abbreviated as "VCO"), and 40 refers to an output terminal of an image clock to be used for reading out signals "0", "1" corresponding to black and white of an image element from a line buffer (not shown) constructed with, for example, a shift register, in which characters to be recorded are memorized in the form of image element trains for one scanning line. Explaining the operations of the beam modulating signal shown in FIG. 2 in reference to the waveform diagram shown in FIG. 13, a numeral 17-1 in FIG. 17 indicates a waveform of the BD signal, and a time instant $t_{21}$ for generating the BD signal is provided, in its locality, at an advanced position with respect to the scanning direction from the starting point of the constituent image plane.

The counter 32 is cleared by the BD signal, and then starts counting of a clock 17-2 (shown in FIG. 17) from the input terminal 31.

The photodetector 30 to detect the BD signal is provided at a predetermined position from the starting point of the scanning image plane. In view, therefore, of the fact that the member of the clock to be generated from a time instant $t_{21}$ to a time instant $t_{22}$ when the light beam reaches the starting point of the image plane is fixed in relation to the scanning speed of the beam and the clock frequency, the counter 32 produces an output signal in the abovementioned count number at the output terminal 33.

Similarly, at a time instant $t_{23}$ corresponding to the end point of the image plane, the counter 32 produces an output signal at the output terminal 34.

Figure 17:
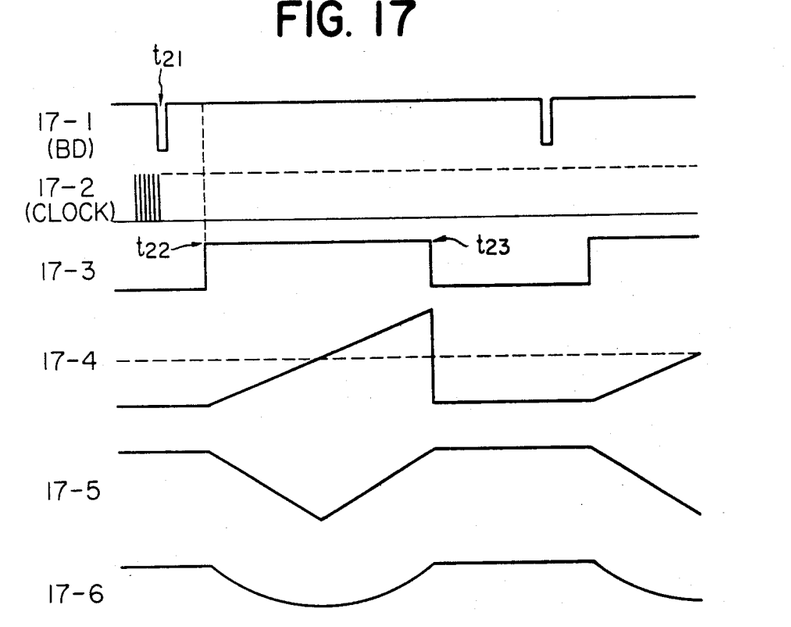
FIGS. 17 and 18 respectively show time charts for electrical circuits in the device shown in FIG. 7.
Figure 18:
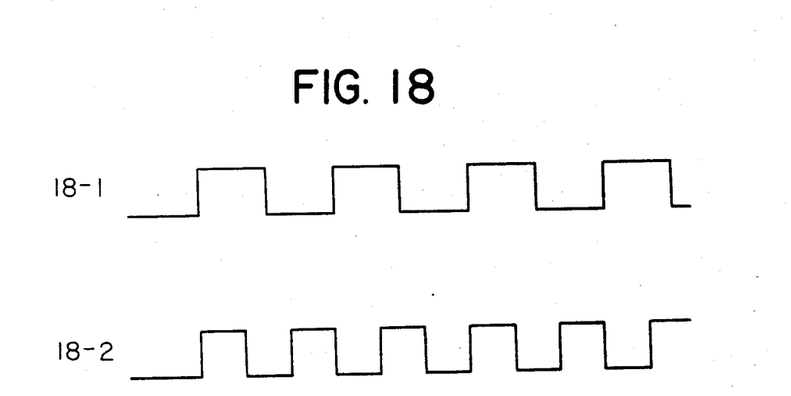

The flip-flop 35 is set by a signal from the output terminal 33, and is reset by a signal at the output terminal 34, whereby a signal 17-3 shown in FIG. 17 is obtained at an output terminal 41. The above signal is integrated by the integration circuit 36 (signal 17-4 in FIG. 17). A signal 17-5 in FIG. 17 is obtained at a terminal 42 through the absolute value circuit 37. From this signal, a corrected waveform approximate to a relationship of $k/2\omega f \cos\{2\omega(t-\delta)\} \cdot \delta = t_{22} + t_{23}/2$ shown in the above equation (8) is further obtained as a signal 17-6 in FIG. 17.

The equations (8), (13), (14) and (15) are all developed in the third order deflecting region (a development at the third order or lower with respect to ($\omega t$)) into $dt = A\{1 + X(\omega t)^2\}$, and are found to be in the same function form in respect of ($\omega t$). It should be noted here that A and X are constants, of which A is a common constant in both equations (8) and (14), and also a common constant in both equations (13) and (15), a value obtained by dividing the constant A by $\phi_0$ corresponding to the common constant A for the equations (13) and (15), and X is a different constant for each of the equations (8), (13), (14) and (15).

These different constants A and X among these equations determine the waveform of the signal 17-6 in FIG. 17, the determination of which can be readily realized by providing the function generator.

The abovementioned corrected waveform 17-6 is introduced as an input into VCO 39 to vary its oscillation frequency. FIG. 18 shows an output signal 18-1 from VCO 39 when the beam spot scans the peripheral region of the scanning image plane, and another output signal 18-2 from VCO 39 when the beam spot scans the center part of the image plane.

As will be apparent from the foregoing explanations, a predetermined correction is effected to the image element frequency constituting the image to modulate the laser beam so as to correct the characteristic of the image forming lens as the beam spot moves toward the peripheral part from the center of the scanning image plane in a symmetrical manner.

In the foregoing, the equi-angular speed rotatory polygonal mirror has been taken for example of the deflector, although it is also possible to easily remove distortion of an output image in accordance with the above-described principle, even when the deflector is the sinusoidally vibrating mirror.

What we claim is:

1. A light beam scanning device comprising:
 (a) a deflector for deflecting an incident light beam in a predetermined direction;
 (b) a scanning surface to be subjected to scanning by the light beam deflected by said deflector;
 (c) an image forming optical system disposed between said deflector and said scanning surface for collecting the light beam deflected by said deflector and for forming an image on said scanning surface, and having a distortional coefficient of ⅔;
 (d) a light source section for supplying the light beam to said deflector; and
 (e) modulation control means which emits a horologically long modulating signal when the light beam passes through a place away from the optical axis of said image forming optical system in comparison with that when the light beam passes in the vicinity of the optical axis of said image forming optical system.

2. The light beam scanning device as set forth in claim 1, wherein the signal from said modulation control means is introduced as an input into a modulator interposed between said deflector and light source section.

3. The light beam scanning device as set forth in claim 1, wherein the signal from said modulation control means is directly introduced as an input into said light source section.

4. A light beam scanning device comprising:
 (a) a deflector for deflecting an incident light beam in a predetermined direction;
 (b) a scanning surface to be subjected to scanning by the light beam deflected by said deflector;
 (c) an image forming optical system disposed between said deflector and said scanning surface for collecting the light beam deflected by said deflector and for forming an image on said scanning surface, said image forming optical system comprising a lens haing the optical characteristics expressed by the equation $$y = f(\tan\theta - \tfrac{2}{3}\tan^3\theta)$$

where
 y = the distance from the optical axis of the lens to the image location of a light beam deflected by the lens;
 $\theta$ = the angle formed by the optical axis of the lens and the light beam entering the lens, and
 f = the focal length of the lens;
 (d) a light source section for supplying the light beam to said deflector; and
 (e) modulation control means which emits a horologically long modulating signal when the light beam passes through a place away from the optical axis of said image forming optical system in comparison with that when the light beam passes in the vicinity of the optical axis of said image forming optical system.

* * * * *

UNITED STATES PATENT AND TRADEMARK OFFICE
CERTIFICATE OF CORRECTION

PATENT NO. : 4,343,531
DATED : August 10, 1982
INVENTOR(S) : MASAMICHI TATEOKA, ET AL.

It is certified that error appears in the above—identified patent and that said Letters Patent is hereby corrected as shown below:

Column 3

Line 46, change "$I(-,V)$ to --$I(\theta,V)$--.

Signed and Sealed this

Twenty-eighth Day of June 1983

[SEAL]

Attest:

GERALD J. MOSSINGHOFF

Attesting Officer    Commissioner of Patents and Trademarks